United States Patent [19]
Tao

[11] Patent Number: 5,717,567
[45] Date of Patent: Feb. 10, 1998

[54] FOLDING RACK SYSTEM FOR MOBILE OFFICE

[75] Inventor: Adam M. Tao, Laguna Niguel, Calif.

[73] Assignee: Toshiba America Information Systems, Irvine, Calif.

[21] Appl. No.: 536,183

[22] Filed: Sep. 29, 1995

[51] Int. Cl.⁶ .................. G06F 1/16; H05K 7/16
[52] U.S. Cl. .......... 361/683; 312/223.3; 361/825; 361/827
[58] Field of Search .................. 108/138, 6, 50, 108/93; 312/208.1, 325, 223.2, 223.3; 364/708.1; 361/683; 400/680, 682, 691

[56] References Cited

U.S. PATENT DOCUMENTS

| | | |
|---|---|---|
| D. 189,868 | 3/1961 | Casselman et al. . |
| D. 344,074 | 2/1994 | Collins . |
| D. 346,901 | 5/1994 | Dulka et al. . |
| 2,696,246 | 12/1954 | Putnam ........................ 108/93 |
| 4,132,295 | 1/1979 | Hochfelsen . |
| 4,595,086 | 6/1986 | Simpson . |
| 4,790,417 | 12/1988 | Tomikawa et al. . |
| 4,837,590 | 6/1989 | Sprague . |
| 4,839,837 | 6/1989 | Chang . |
| 4,840,258 | 6/1989 | Tomikawa et al. . |
| 4,851,812 | 7/1989 | Holmberg ............ 364/708.1 X |
| 4,929,948 | 5/1990 | Holmberg ................... 361/683 |
| 5,010,988 | 4/1991 | Brown . |
| 5,074,413 | 12/1991 | Ikuta et al. . |
| 5,115,893 | 5/1992 | Terkildsen . |
| 5,160,001 | 11/1992 | Marceau . |
| 5,206,790 | 4/1993 | Thomas et al. . |
| 5,212,628 | 5/1993 | Bradbury ..................... 361/683 |
| 5,214,574 | 5/1993 | Chang . |
| 5,217,119 | 6/1993 | Hollingsworth . |
| 5,379,893 | 1/1995 | Ruiz . |
| 5,437,367 | 8/1995 | Martin . |
| 5,445,266 | 8/1995 | Prete et al. . |
| 5,590,022 | 12/1996 | Harvey ....................... 361/683 |

*Primary Examiner*—Michael W. Phillips
*Attorney, Agent, or Firm*—Banner & Witcoff, Ltd.

[57] ABSTRACT

A mobile office system includes a folding rack system for integrating with a computer system including a portable computer and peripheral components. The folding rack system includes a first shelf for supporting a portable computer and a port replicator, and a second shelf for supporting one or more peripheral components. A connecting structure is provided for coupling the first shelf and the second shelf, wherein the connecting structure moves the second shelf between a stowage position and a computer operating position. The computer, port replicator and peripheral component can remain attached to the folding rack system when in the stowage position and when stowed in a carrying case. A retaining mechanism is coupled to the connecting structure for retaining the second shelf in an intermediate position between the stowage position and the operating position. A cable for connecting the portable computer and the peripheral components is embedded into the connecting structure.

22 Claims, 5 Drawing Sheets

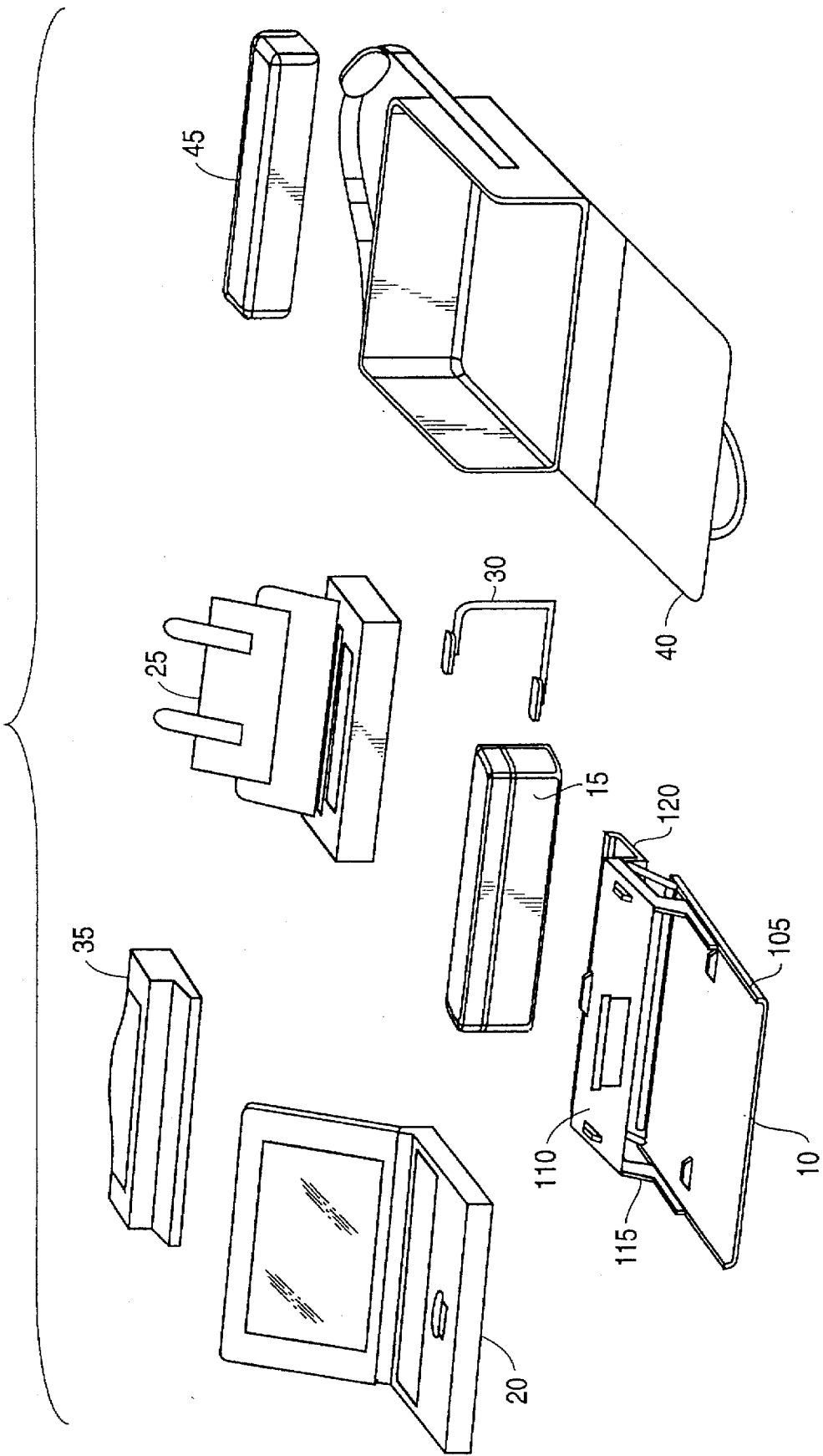

FOLDING RACK SYSTEM FOR MOBILE OFFICE

FIELD OF THE INVENTION

The present invention generally relates to a mobile office system including an apparatus for integrating a portable computer and various computer related elements. More particularly, a lightweight folding rack system is provided which allows a portable computer to be connected to peripheral elements and utilized in many environments with relative ease.

BACKGROUND OF THE INVENTION

Portable computers have become commonplace in today's fast-paced high tech environment. Such portable computers include laptops, notebook, pen, and palmtop computers. The portability of these computers has benefited, among others, sales agents and people engaged in business and travel.

Individuals such as sales people can now go into the field with a large inventory of samples and order forms stored in memory of a portable computer or in an auxiliary storage device such as a CD-ROM and retrieve the same for display on a monitor. Likewise, insurance adjusters may now take portable computers to the scene of property or automobile damage, retrieve the appropriate forms and input data directly into the stored form.

Although the portable computer can provide for instantaneous input as desired and at other times in accordance with various programs, it does not provide for other facilities typically found in an office or home. In both of the examples above, often the individual may want to print one of their forms for a customer or for their own use. However, peripheral devices such as printers, disk drives, modems, speakers, power supplies, facsimile machines, CD-ROMS, etc. have not been conveniently and compactly transportable with portable computers.

Like computers, peripherals have also been becoming smaller and more lightweight. The concept of a mobile office, where the conveniences found in the office, are now portable is quickly become a reality. Individuals who employ portable computers in the field must be able to safely transport the elements of the mobile office system including, among other things, the computer and peripheral elements between working locations. Further, quick and convenient set-up of the mobile office system for operation is necessary.

Previously, a portable computer would have to be carried separately from a portable printer or other peripherals. To utilize the units together, they were placed on any available flat surface and connected via a printer cable every time the system was used.

U.S. Pat. No. 5,437,367 to Martin attempts to realize a mobile office system. Martin provides a hard-sided carrying case for a computer and related components which can be used on a table or desk as a work station. The carrying case has a first shell half and a second shell half connected along hinged edges. One shell half contains two shelves foldable from a stored position laying parallel to the plane of the shells to a use position perpendicular thereto. When in the use position, a first shelf and a second shelf provide support for a notebook computer with its built-in monitor and an accessory device such as a printer, respectively. The components are releasably attached to the shelves such that the shelves may be placed in their closed position without the components thereon.

Several problems are associated with the Martin invention. For example, since each element must be removed when the shelves are closed, each time a user wants to set up the mobile office, time is required to attach the components to the shelves, and it would appear that the peripheral components also must be wired to the computer. The cables used to wire components together are delicate and their susceptibility to damage is high particularly when they must be repeatedly connected and disconnected. Further, the hardsided case utilized increases the weight of the system.

Another attempt to realize a mobile office system is disclosed in U.S. Pat. No. 5,214,574 to Chang which provides a portable computer housing in combination with a multi-component portable computer. A computer housing having two pivotally attached shells is presented which provides one shell adapted to closely enshroud a portable computer with the other shell adapted to closely enshroud a portable printer. The computer is transportable in the housing and usable therein without impeding access to the keyboard and the peripheral devices. The Chang portable computer housing has several drawbacks. For example, the computer housing is bulky and requires a fair amount of surface space.

SUMMARY OF THE INVENTION

The present invention solves the aforementioned problems by providing a small, lightweight, mobile office system which can be quickly and conveniently set-up for instant on-site productivity. Further, there is no need to attach cables between peripheral elements and the computer each time the computer is used.

The mobile office system includes a folding rack system which can integrate a portable computer, a port replicator and one or more peripheral components. A lightweight shock resistant carrying case can house the folding rack system with a portable computer, a port replicator and peripheral elements removably attached thereto.

The folding rack system includes two shelves and a connecting structure for coupling the two shelves together. A first shelf can support a portable computer, and can also be adapted to support a port replicator alone or with a portable computer attached thereto. A second shelf can support one or more peripheral elements. Preferably, each peripheral element is coupled to the portable computer directly or via a port replicator when used. The connecting structure moves the second shelf between a stowage position wherein the second shelf is substantially over the first shelf and a system operating position in which the first shelf or the port replicator, if employed, is substantially exposed. The connecting structure also can move the second shelf to a computer connecting position where a vertical distance between the first shelf and the second shelf is at a maximum.

BRIEF DESCRIPTION OF THE DRAWINGS

A more complete appreciation of the present invention and many of the attendant advantages thereof will be readily obtained as the invention becomes better understood by reference to the following detailed description when considered in connection with the accompanying drawings.

FIG. 1 shows various individual elements which may be included in an exemplary mobile office system according to the present invention.

DETAILED DESCRIPTION OF THE PREFERRED EMBODIMENTS

Figure 2A:
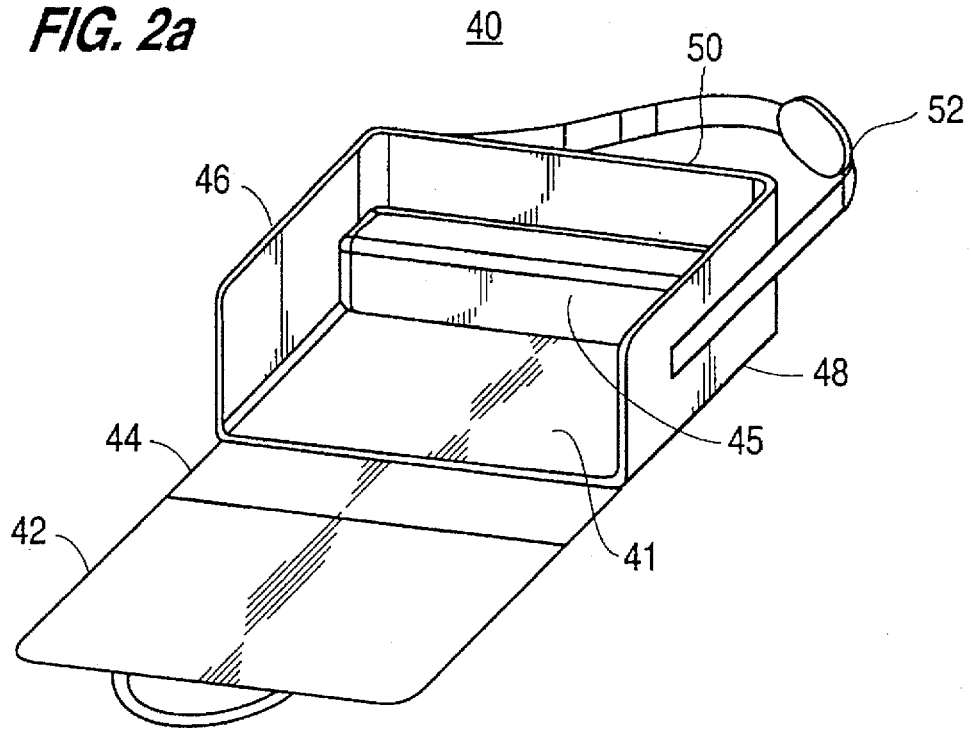
FIG. 2a shows a carrying case in an open position according an illustrative embodiment of the present invention.

For the sake of convenience, the present invention will be described in terms of a notebook computer. However, it should be understood that other portable computers, such as laptops, palmtops and pen computers, may be associated with a mobile office system in accordance with the present invention. In addition, while the present invention will be described primarily in the context of a printer as a peripheral component, it should be understood that the present invention may be used in conjunction with other peripheral elements and accessories including, but not limited to, a disk drive, a modem, speakers, a power supply, CD-ROMS, a global positioning system (GPS) including a receiver, a magnetic card reader, a display monitor, a signature capture device, a pointing device, a check reader, a credit card reader, a business card reader, a power converter, a cellular phone, a scanner, a wireless LAN card, a video conference system, an IR transceiver, an optical disk reader, a bar code reader, and a portable facsimile machine. Also, it is envisioned that communication between the computer and its peripheral components can be wireless, although the present invention will be described with respect to wired communications.

A mobile office system according to the present invention integrates a notebook computer, preferably with a CD-ROM drive, a rack system, a portable printer, and a carrying case. The system offers a portable, practical, convenient, and cost effective answer to the requirements of total portability in the multimedia mobile office environment. A broad array of solutions requiring on-site computer analysis and multimedia applications, as well as delivery of quality hard copy documentation, can be realized with a mobile office system according to the present invention.

FIG. 1 shows each of the individual components included in a mobile office system according to the present invention. By no means should all the components in FIG. 1 be considered required or exhaustive for a mobile office system according to the present invention.

A folding aluminum rack system 10 includes a lower shelf 105, an upper shelf 110, and a connecting structure 115 for coupling the lower shelf 105 to the upper shelf 110. Each shelf may have one or more holes which makes the rack system lighter and also allows components resting on the shelves to breathe during operation. Optionally, the upper shelf 110 may include an extension 120 removably coupled thereto. The extension 120 can removably support one or more peripheral elements, a battery for providing power to the printer, computer, and/or other peripheral elements, or, as shown in FIG. 1, an accessory compartment 15. The rack system may be constructed of aluminum. However, any lightweight material such as a metal, metal alloy, composite, or a combination thereof may be employed.

A notebook computer 20 can be removably supported or held on the lower shelf 105 by holding means such as clips, clamps, jaws, VELCRO™ fasteners where VELCRO™ strips are on both the lower shelf 105 and the bottom of the notebook computer 20, or other equivalent means to removably attach the computer 20 to the lower shelf 105. VELCRO™ is a trademark for fasteners including a piece of fabric of small hooks that sticks to a corresponding fabric of small loops.

A portable printer 25, preferably with a long life battery therein, can be removably attached to the upper shelf 110 of the rack system 10 using holding means as described above. For example, hold-down clamps mounted on the front and back sides and/or the other sides of the upper shelf 110 may be used to hold the portable printer 25. The portable printer 25 may be battery powered or AC powered. An exemplary portable printer is the Tally MobileJet™ by Mannesman which can provide ink jet output on two sizes of plain paper and includes a fifteen page sheet feeder for continuous printing of 15 pages.

According to one embodiment, the portable printer 25 may be connected and communicatively coupled to the notebook computer 20 via a cable 30, which can be wired directly to a port on the back of the notebook computer 20. However, the cable 30 may connect the portable printer 25 to a port replicator 35. The port replicator 35 is removably attached to the back portion of the lower shelf 105 using holding means as described above or for example, using three extended machine screws.

Also, the printer 25 can be communicatively coupled to the notebook computer 20 through a wireless link such as an infrared (IR) or radio frequency (RF) interface with, for example, a transceiver coupled to the notebook computer 20 and another transceiver coupled to the printer 25. For both the notebook computer 20 and the printer 25, the RF and IR transceivers may be built in, or stand-alone devices coupled thereto.

The rack system 10 is appropriately sized to accommodate the notebook computer 20 and the port replicator 35 while minimizing the bulk and weight of the mobile office system. When a port replicator 35 is not employed, the rack system 10 may be sized accounting for a notebook computer 20 or may be sized with the ability to accommodate a notebook computer 20 in combination with a port replicator 35. While the remaining description will primarily focus on the mobile office system having a port replicator, it is to be understood that the system can be conveniently adapted to function without a port replicator.

The port replicator 35 is a device which duplicates ports on the back of a typical computer. The port replicator 35 typically has power input means for receiving power from a power supply, at least one data input/output port, and connector means for communicatively connecting the notebook computer 20 with the power input means and the at least one data input/output port. The connector means is engageable with mating connector means provided on notebook computer 20 by positioning notebook computer 20 on the lower shelf 105 and moving the notebook computer 20 against the port replicator 35, and disengageable from the mating connector means by moving the notebook computer 20 away from the port replicator 35. A locking or clamping mechanism on the port replicator 35 can be employed to secure the notebook computer 20 to the port replicator 35 when mated thereto. This minimizes the potential for damage to the mating connector when the computer is suddenly moved in any direction, which can occur during transport. The lower shelf 105 does not require holding means when the port replicator locking mechanism is available and the notebook computer 20 can simply rest on the lower shelf 105.

One of the advantages provided by using the port replicator is ease in connecting peripheral elements to the computer without connecting and disconnecting the cable each time the system is enabled and disabled. Peripheral elements mounted on the rack system can be wired into the ports of the port replicator once. Thus, each time the mobile office is opened, it is not necessary to wire the components of the system together. Further, when the computer is detached from the port replicator, all peripherals attached thereto do not have to be detached. Thus, the computer can easily be removed from and inserted into the system when using a port replicator.

An exemplary notebook computer and port replicator adaptable for use with the present invention are the Toshiba T2150CDT notebook computer and the Toshiba PA2708U port replicator. It is to be understood that other portable computers and port replicators compatible therewith can be used with a rack system according to the present invention. The rack system 10 can be designed to be size compatible with the desired portable computer port replicator combination.

A lightweight carrying case 40 may be used to house each element of the mobile office system for transportability. The carrying case 40 is built to contain the rack system 10 integrating the computer system elements including the notebook computer 20, the port replicator 35, the portable printer 25, and other peripherals, and any accessories. Hook and loop fasteners can optionally be used to hold the lower shelf 105 to the carrying case when desired. Further, the case 40, when open may be used as a surface for operating the computer in the mobile office environment. The case 40 can be made of a lightweight reinforced shock resistant material such as a nylon fabric with foam padding therein, to protect the mobile office system while providing a light, convenient way to transport the same. Optionally, the carrying case 40 may include a removable accessory compartment 45 made of fabric for storing other peripheral components and accessories.

Accessory compartment 45 can be removably attached to the interior of the case 40. According to one embodiment, VELCRO™ strips are located on a portion of the interior of the carrying case 40 and on a bottom portion of the accessory compartment 45 so that the accessory compartment 45 can be easily attached to and removed from the case 40. The accessory compartment 45 can be made of the same lightweight shock resistant material that the case is made of or the like, and can be opened for retrieval of accessories and closed for storage of the same. The compartment 45 may have a zipper, snaps, VELCRO™ or other equivalent fastening means to open and close the compartment 45.

Figure 2B:
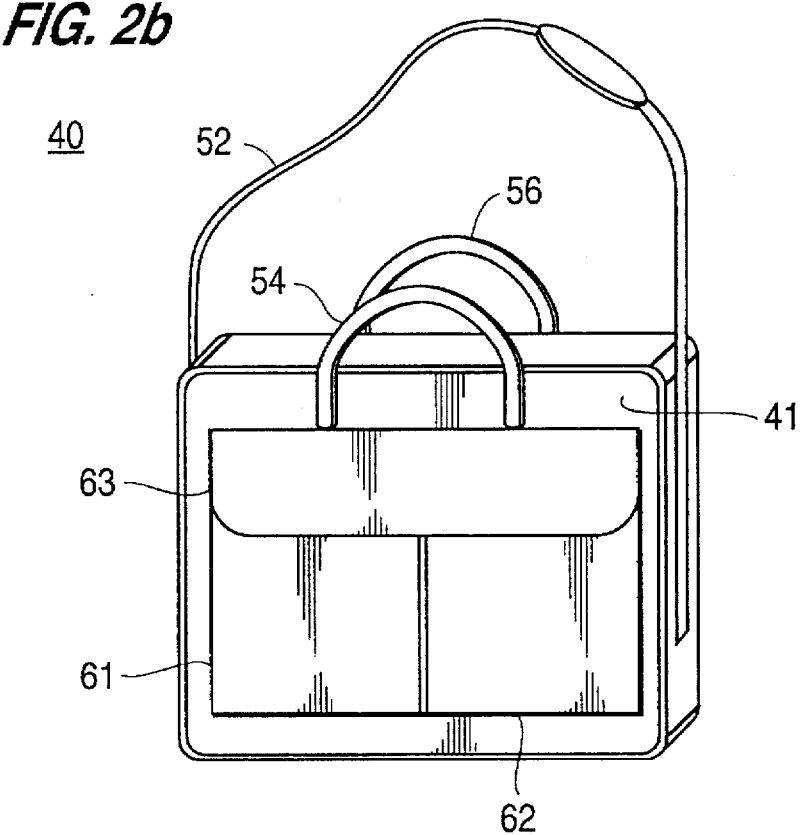
FIG. 2b shows a carrying case in a closed position according to an illustrative embodiment of the present invention.

An exemplary carrying case 40 for the present invention is shown more specifically in FIGS. 2a, and 2b. FIG. 2a shows the carrying case 40 in an open position where the mobile office system can be removed therefrom or operated thereon. A bottom wall 44 is attached to a first side wall 41 and a second side wall 42. A pair of non-skid feet may be fixedly mounted on the outside portion of the bottom wall 44. The second side wall 42 and the bottom wall 44 are releasably attached to vertical walls 48, 50, and 46 and are detached from the vertical walls 48, 50, and 46 of the case 40 when it is opened. A fastening means such as a zipper connects the side wall 42 and opposite sides of the bottom wall 44 to the vertical walls 46 and 48 of the case 40 and also connects the side wall 42 to the top wall 50. A removable accessory compartment 45 may be coupled to a rear portion of the side wall 41 proximate to the top wall 50. VELCRO™ strips or snaps can be used to fasten compartment 45 to the side wall 41.

A shoulder strap 52 can be fixedly or removably coupled to side walls 46 and 48. One or two tote handles may be fixedly or removably coupled to the top wall 50 or two tote handles 54, 56 may be fixedly or removably coupled to side walls 41, 42, respectively, as shown in FIG. 2b.

FIG. 2b shows the carrying case 40 in a closed position. When the components of mobile office system are in the carrying case 40 and the case is in the closed position, the mobile office system is fully transportable and can be carried by for example, the shoulder strap 52 or the tote handles 54, 56. The side walls 41, 42 and vertical walls 46, 48 of the case 40 may contain closable pockets for storing, among other things, accessories such as an external floppy drive, floppy disks, CD-ROMS, paper, etc. In the exemplary embodiment shown in FIG. 2b, pockets 61, 62, 63 are shown on side wall 41.

Figure 3A:
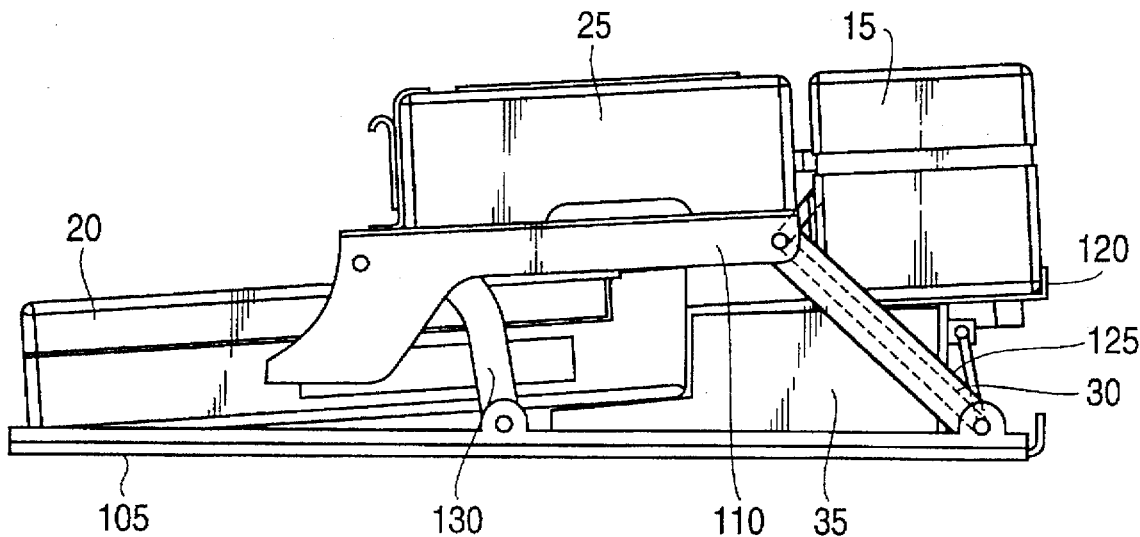
FIG. 3a shows a rack system integrated with a computer system in a stowage position according to an exemplary embodiment of the present invention.
Figure 3B:
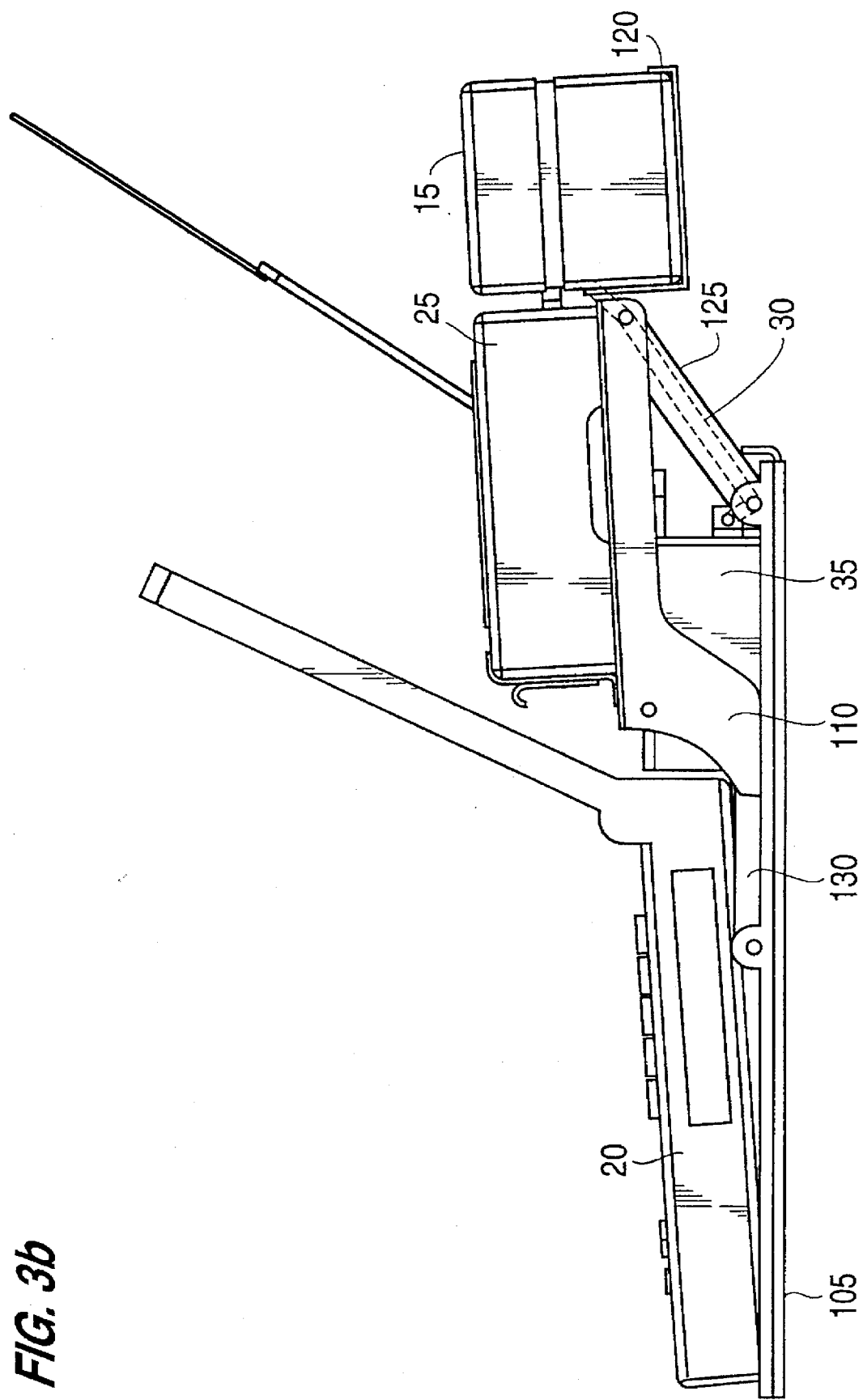
FIG. 3b shows a rack system integrated with a computer system in a system operating position according to an exemplary embodiment of the present invention.
Figure 3C:
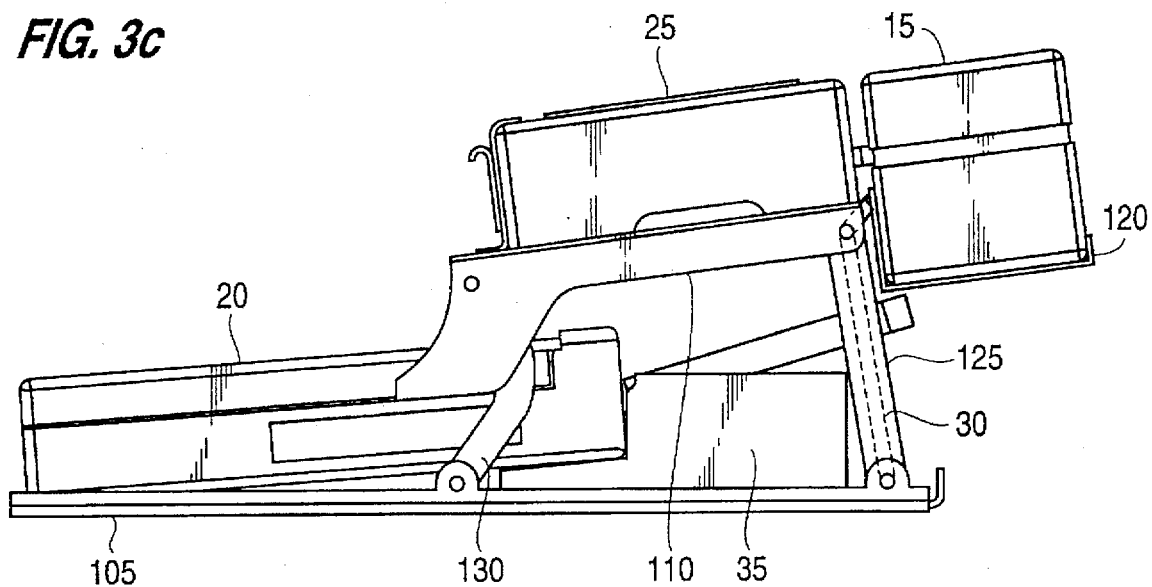
FIG. 3c shows a rack system integrated with a computer system in a computer connecting position according to an exemplary embodiment of the present invention.

FIGS. 3a, 3b, and 3c show the mobile office system with the folding rack system for integrating a notebook computer 20, a printer 25, and a port replicator 35. The folding rack system includes a lower shelf 105, an upper shelf 110, and a connecting structure for coupling the lower shelf 105 to the upper shelf 110.

According to an exemplary embodiment of the invention, the connecting structure includes two pivot arms 125, 130 for coupling a first side of the lower shelf 105 to a first side of the upper shelf 110. Two other pivot arms couple a second side of the lower shelf 105 to a second side of the upper shelf 110, the second side of each of the lower and upper shelves being on the opposite side of the first side of the respective shelves. This relation can be seen by referring to the folding rack system 10 depicted in FIG. 1. Each pivot arm is attached to the lower shelf 105 and the upper shelf 110 by a fastening or holding means, such as a screw and arm pivot combination, which allows the pivot arms to move along a parallel plane. Accordingly, the upper shelf 110 can be moved relative to the lower shelf 105 or vice versa.

The pivot arms joining the upper shelf 110 and the lower shelf 105 are swingable and move the upper shelf 110 between a stowage or closed position and a system operating or open position. In the closed position depicted in FIG. 3a, the printer 25 is immediately above the notebook computer 20. Thus, the rack is folded into a very compact unit which makes the mobile office easy to transport. In the open position depicted in FIG. 3b, the rack is unfolded allowing for the notebook computer 20 and the printer 25 and other peripherals to be used when stationary. When in the open position, the printer 25 is above and behind the notebook computer 20.

The pivot arms may also move the upper shelf 110 to an intermediate position or computer connecting position in which a space is provided between the upper shelf 110 and the lower shelf 105 to allow the notebook computer 20 to be coupled to the port replicator 35 or attached to and supported by the lower shelf 105 when no port replicator is employed. The intermediate position is depicted in FIG. 3C. According to one embodiment, the vertical distance between the upper shelf 110 and the lower shelf 105 is at a maximum when in the intermediate position. In an embodiment without a port replicator or in an embodiment where the port replicator does not have a locking mechanism, while in the open position, the notebook computer 20 may respectively be attached to the lower shelf 105, or the port replicator 35 and the lower shelf 105.

Figure 4:
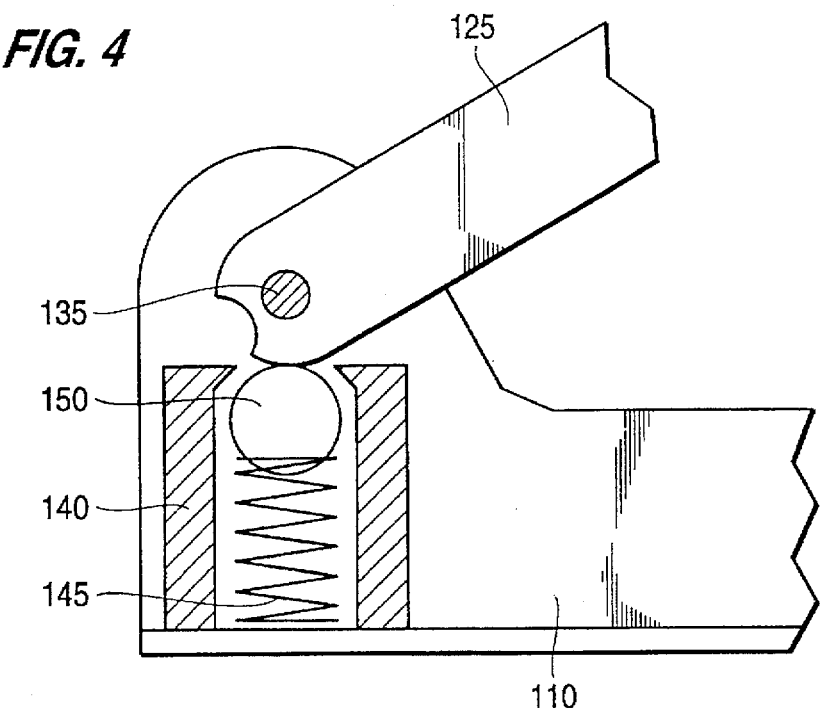
FIG. 4 shows an illustrative retaining mechanism for retaining a rack system integrated with a computer system in a computer connecting position according to the present invention.

The rack system may have a retaining mechanism built-in to hold the upper shelf 110 at the intermediate position between the open and closed positions so that the notebook computer 20 can be easily attached to and released from the port replicator 35. An exemplary retaining mechanism is depicted in FIG. 4. In this embodiment, the mechanism is located between the rear pivot arms and the respective portion of the lower shelf 105 to which the pivot arms are attached. The mechanism is shown for one of the pivot arms 125 in figure 4 in a forward released position. Other conventional retaining mechanisms such as a U-shaped retaining clip fastened to the upper shelf 110 may also be used.

As shown in FIG. 4, pivot arm 125 is coupled to lower shelf 105 by arm pivot 135 in conjunction with a fastening means, for example a screw (not shown). The retaining or locking mechanism includes a mechanism retainer 140 attached to the lower shelf 105. Inside the retainer 140 is a spring 145 also attached to the lower shelf 105. A detent ball 150 is coupled to the spring 145. As the pivot arm 125 moves from a forward release position to a direction perpendicular to the lower shelf 105, the detent ball 150 rollably contacts the surface of the pivot arm 125. The bottom portion of the pivot arm 125 is arc-shaped so that when the pivot arm is perpendicular to the lower shelf, the spring 145 forces the detent ball 150 therein. When the detent ball 150 is in the arc-shaped portion of the pivot arm 125, the rack system is secured in the intermediate position. The force required to compress the spring 145 to move the rack system from the intermediate position to either a forward or backward released position is sufficient to retain the rack system in this intermediate position while attaching the computer 20 to the port replicator 35.

In lieu of the pivot arms serving as the connecting structure, other equivalent connecting structures which allow the upper shelf to be moved relative to the lower shelf between at least a stowage position and a system operating position may also be used. For example, a track located on the sides or top of the lower shelf can be used where a connecting structure such as a track arm, for coupling a track portion of the lower shelf to the upper shelf, slides along the track portion to move the upper shelf relative to the lower shelf between a stowage position to a system operating position.

On the extension portion 120 of the upper shelf 110 of the rack system, a detachable accessory compartment 15 made of a lightweight material such as fabric, may contain AC adapters for both the notebook computer 20 and the portable printer 25, as well as other possible accessories may be included. For example, the AC adapter may be a car battery adapter for attachment to a car cigarette lighter. Coupling each element together can be carried out using VELCRO™ strips on both the extension portion 130 and the bottom of the accessory compartment 15. AC adapters stored in the accessory compartment 15 can be used to connect the notebook computer 20 and/or printer 25 to an external power supply when desired.

The printer 25 may be communicatively coupled to the notebook computer 20 directly when no port replicator is used or to the port replicator 35 through a cable 30 that can be embedded into or held against one of the pivot arms, for example pivot arm 125 as shown in FIGS. 3a, 3b, and 3c. According to one embodiment, a clamp around the cable 30 is fastened to the pivot arm 125 using at least one screw. Such an arrangement improves the space efficiency of the rack system. Also, the IR and RF communicative coupling discussed previously may be employed. In one embodiment using IR coupling, the notebook computer may be wired to a stand alone IR transceiver positioned on the upper shelf which transmits and receives IR control signals from other peripheral elements located on the upper shelf 110 and/or optionally, an upper shelf extension 120.

The above-described mobile office system has many advantages. For example, to deploy the system, the operator simply lays the case down on any surface, unzips and fully opens the top portion of the case, unfolds the rack, and begins to work on the computer system. Also, the mobile office system folds into a compact unit which is easily transportable. According to an exemplary embodiment including the protective carrying case with the portable computer, printer, rack system, port replicator, and AC power adapter stored therein, the case dimensions are 6"×13"×14" and the mobile office system weighs twenty pounds. All system components may be powered by either rechargeable batteries or an AC power supply. The portable printer and computer can be operated and charged without being removed from the rack system or the carry case. Also, the individual components can be quickly removed and replaced for easy servicing. The rack system with the computer, its port replicator and a printer can be used with the carrying case or as a stand alone system without the carrying case.

Although illustrative embodiments of the present invention have been described in detail with reference to the accompanying drawings, it is to be understood that the invention is not limited to those precise embodiments and that changes and modifications may be effected therein by those in the art without departing from the scope and spirit of the invention.

What is claimed is:

1. An apparatus for integrating a portable computer and a computer peripheral element in a mobile office system, said apparatus comprising:

a first shelf for supporting the portable computer;

a second shelf for supporting the computer peripheral element;

a connecting structure for coupling said first shelf to said second shelf and for moving said second shelf to an intermediate position between a stowage position and a system operating position; and a retaining mechanism coupled to said connecting structure for retaining said second shelf in the intermediate position.

2. The apparatus according to claim 1, wherein said connecting structure includes a plurality of pivot arms coupling said first shelf and said second shelf, wherein said pivot arms are swingable and move said second shelf between the stowage position and the system operating position.

3. The apparatus according to claim 1, wherein said second shelf is substantially over said first shelf in the stowage position and said first shelf is substantially exposed in the system operating position.

4. The apparatus according to claim 1, wherein said connecting structure moves said second shelf between the stowage position, the system operating position, and the intermediate position in which a space is provided between said first shelf and said second shelf to allow a portable computer to be attached to and supported by said first shelf.

5. The apparatus according to claim 1, wherein said connecting structure moves said second shelf between the stowage position and the system operating position where a vertical distance between said first shelf and said second shelf is a maximum in the intermediate position.

6. The apparatus according to claim 1, wherein said first shelf and said second shelf have a plurality of holes.

7. The apparatus according to claim 1, further including a second shelf extension removably coupled to said second shelf for supporting an accessory.

8. The apparatus according to claim 7, wherein said accessory includes another peripheral element.

9. The apparatus according to claim 7, wherein said accessory includes an accessory compartment.

10. A mobile office system comprising:
   a computer system including,
      a port replicator,
      a computer peripheral element, communicatively coupled to said port replicator, and
      a portable computer communicatively coupled to said port replicator; and
   a rack system including,
      a first shelf having said port replicator removably attached thereto, said portable computer partially resting on said first shelf,
      a second shelf having said computer peripheral element removably attached thereto,
      a connecting structure for coupling said first shelf to said second shelf, wherein said connecting structure moves said second shelf to an intermediate position between a stowage position and a system operating position; and
      a retaining mechanism coupled to said connecting structure for retaining said second shelf in the intermediate position.

11. The mobile office system of claim 10 further comprising a case for housing said computer system integrated together with said rack system.

12. The mobile office system of claim 11, wherein said carrying case includes means for fastening said rack system to a side wall of said carrying case.

13. The mobile office system according to claim 10, wherein said connecting structure includes a plurality of pivot arms coupling said first shelf and said second shelf, wherein said pivot arms are swingable and move said second shelf between the stowage position and the system operating position.

14. The mobile office system according to claim 10, further including a second shelf extension removably coupled to said second shelf for supporting an accessory.

15. The mobile office system of claim 10, wherein said port replicator is partially exposed in the system operating position.

16. A mobile office system comprising:
   a computer system including,
      a computer peripheral element, and
      a portable computer communicatively coupled to said computer peripheral element; and
   a rack system including,
      a first shelf supporting said portable computer,
      a second shelf having said computer peripheral element removably attached thereto,
      a connecting structure for coupling said first shelf to said second shelf, wherein said connecting structure moves said second shelf to an intermediate position between a stowage position and a system operating position; and
      a retaining mechanism coupled to said connecting structure for retaining said second shelf in the intermediate position.

17. The mobile office system according to claim 16, wherein said portable computer and said computer peripheral element are communicatively coupled by an RF link.

18. The mobile office system according to claim 16, wherein said portable computer and said computer peripheral element are communicatively coupled by an IR link.

19. The mobile office system according to claim 18, wherein said portable computer and said computer element each have a built in IR transceiver.

20. The mobile office system according to claim 16, wherein said computer peripheral element is an IR transceiver positioned on said second shelf.

21. The mobile office system according to claim 20, wherein said IR transceiver communicatively couples said portable computer to a further computer peripheral element having an IR transceiver.

22. An apparatus for integrating a portable computer and a computer peripheral element in a mobile office system, said apparatus comprising:
   a first shelf for supporting the portable computer;
   a second shelf for supporting the computer peripheral element;
   a connecting structure for coupling said first shelf to said second shelf and for moving said second shelf between a stowage position and a system operating position; and
   a cable for communicatively coupling the portable computer and the computer peripheral element, said cable is embedded into said connecting structure.

* * * * *